(12) United States Patent
Kitamura et al.

(10) Patent No.: US 12,343,967 B2
(45) Date of Patent: Jul. 1, 2025

(54) DECORATIVE LAMINATE, METHOD OF PRODUCING DECORATIVE LAMINATE, AND VEHICLE

(71) Applicant: NIPPON PAINT AUTOMOTIVE COATINGS CO., LTD., Hirakata (JP)

(72) Inventors: Masahiro Kitamura, Hirakata (JP); Takakazu Hase, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 18/553,199

(22) PCT Filed: Mar. 31, 2022

(86) PCT No.: PCT/JP2022/016958
§ 371 (c)(1),
(2) Date: Sep. 29, 2023

(87) PCT Pub. No.: WO2022/211115
PCT Pub. Date: Oct. 6, 2022

(65) Prior Publication Data
US 2024/0165932 A1    May 23, 2024

(30) Foreign Application Priority Data

Apr. 2, 2021   (JP) ................ 2021-063714

(51) Int. Cl.
| | | |
|---|---|---|
| B32B 27/08 | (2006.01) | |
| B32B 7/12 | (2006.01) | |
| B32B 15/095 | (2006.01) | |
| B32B 15/18 | (2006.01) | |
| B32B 27/32 | (2006.01) | |
| B32B 27/36 | (2006.01) | |
| B32B 27/40 | (2006.01) | |

(Continued)

(52) U.S. Cl.
CPC ............... *B32B 27/08* (2013.01); *B32B 7/12* (2013.01); *B32B 15/095* (2013.01); *B32B 15/18* (2013.01);
(Continued)

(58) Field of Classification Search
None
See application file for complete search history.

(56) References Cited

U.S. PATENT DOCUMENTS

| | | |
|---|---|---|
| 2007/0084542 A1 | 4/2007 | Montagna et al. |
| 2020/0282702 A1 | 9/2020 | Sugiyama et al. |

FOREIGN PATENT DOCUMENTS

| | | | |
|---|---|---|---|
| JP | H08187828 A | 7/1996 | |
| JP | H09150487 A | 6/1997 | |

(Continued)

OTHER PUBLICATIONS

JP2014040055 (same as JP5954048) Machine Translation via WIPO (Year: 2014).*

(Continued)

*Primary Examiner* — Laura C Powers
(74) *Attorney, Agent, or Firm* — KENJA IP LAW PC (57) ABSTRACT

Provided is a decorative laminate having excellent distinctness of design of a design layer and excellent surface smoothness of a clear layer after removal of a cover film. The decorative laminate includes a cover film, a clear layer, a design layer, a substrate film, and an adhesive layer adjacently to one another in order. The cover film is thermally laminated to the clear layer. The design layer is a coating film of a design layer coating material. The clear layer is a coating film of a clear layer coating material.

11 Claims, 3 Drawing Sheets

(51) Int. Cl.
 *B32B 37/06* (2006.01)
 *B32B 37/24* (2006.01)
(52) U.S. Cl.
 CPC .............. *B32B 27/32* (2013.01); *B32B 27/36* (2013.01); *B32B 27/40* (2013.01); *B32B 37/06* (2013.01); *B32B 37/24* (2013.01); *B32B 2037/243* (2013.01); *B32B 2255/10* (2013.01); *B32B 2255/26* (2013.01); *B32B 2255/28* (2013.01); *B32B 2307/4023* (2013.01); *B32B 2307/748* (2013.01); *B32B 2309/02* (2013.01); *B32B 2333/08* (2013.01); *B32B 2605/003* (2013.01)

(56) References Cited

FOREIGN PATENT DOCUMENTS

| JP | H1110065 A | | 1/1999 |
|---|---|---|---|
| JP | H1199597 A | | 4/1999 |
| JP | H1199598 A | | 4/1999 |
| JP | 2003253160 A | | 9/2003 |
| JP | 2014040055 A | * | 3/2014 |
| JP | 2020110960 A | | 7/2020 |

OTHER PUBLICATIONS

Oct. 3, 2023, International Preliminary Report on Patentability issued in the International Patent Application No. PCT/JP2022/016958.

Aug. 24, 2021, Notification of Reasons for Refusal issued by the Japan Patent Office in the corresponding Japanese Patent Application No. 2021-063714.

Jun. 7, 2022, International Search Report issued in the International Patent Application No. PCT/JP2022/016958.

Mar. 11, 2025, the Extended European Search Report issued by the European Patent Office in the corresponding European Patent Application No. 22781323.5.

* cited by examiner

DECORATIVE LAMINATE, METHOD OF PRODUCING DECORATIVE LAMINATE, AND VEHICLE

TECHNICAL FIELD

The present disclosure relates to a decorative laminate, a method of producing a decorative laminate, and a vehicle.

BACKGROUND

Decorative sheets that are affixed to the surfaces of articles are used for enhancing design properties of article surfaces (for example, refer to Patent Literature (PTL) 1). A decorative sheet according to PTL 1 includes a release film, a design layer, and a coating film containing a urethane resin in order. The examples of PTL 1 disclose production of a decorative sheet that includes a release film, a design layer (composed of a clear coat layer, a coloring layer, and a PVC film), a urethane layer, an adhesive layer, and a PET film in order.

CITATION LIST

Patent Literature

PTL 1: JP2020-110960A

SUMMARY

Technical Problem

The decorative sheet according to PTL 1 is affixed to an object and then has the release film peeled off so as to expose the design layer and thereby impart design properties to the object. However, the decorative sheet according to PTL 1 has inadequate surface smoothness of the design layer (clear coat layer) after peeling of the release film. In a situation in which the closest layer to an observer after peeling of a release film has low surface smoothness (i.e., in a situation in which the height and period of irregularities at the surface of the layer are large), these irregularities may be visible to the observer, and thus the decorative sheet may have poorer design properties.

Moreover, with the decorative sheet according to PTL 1, there have been cases in which mixing of the clear coat layer and the coloring layer has occurred. Mixing of the clear coat layer and the coloring layer may result in reduction of distinctness of design of the coloring layer as viewed by an observer and deterioration of design properties of the decorative sheet.

Accordingly, one object of the present disclosure is to provide a decorative laminate having excellent distinctness of design of a design layer and excellent surface smoothness of a clear layer after removal of a cover film. Another object of the present disclosure is to provide a method of producing this decorative laminate. Yet another object of the present disclosure is to provide a vehicle including a laminate having excellent design properties.

Solution to Problem

A decorative laminate according to the present disclosure comprises, adjacently to one another in order:
a cover film;
a clear layer;
a design layer;
a substrate film; and
an adhesive layer, wherein
the cover film is thermally laminated to the clear layer,
the design layer is a coating film of a design layer coating material, and
the clear layer is a coating film of a clear layer coating material.

This results in excellent distinctness of design of the design layer and excellent surface smoothness of the clear layer after removal of the cover film.

In one embodiment of the decorative laminate according to the present disclosure, the clear layer coating material contains an acrylic resin, and the acrylic resin has a glass-transition temperature (Tg) of 20° C. to 100° C.

In one embodiment of the decorative laminate according to the present disclosure, an absolute value of a difference between a solubility parameter (SP) value of a resin component of the clear layer coating material and a solubility parameter (SP) value of a resin component of the design layer coating material is 0.10 or more.

In one embodiment of the decorative laminate according to the present disclosure, short wave is 1.0 to 30.0 and long wave is 1.0 to 20.0 in a wave-scan of a surface of the clear layer in a state in which the cover film has been removed.

A method of producing a decorative laminate according to the present disclosure is a method of producing a decorative laminate including a cover film, a clear layer, a design layer, a substrate film, and an adhesive layer adjacently to one another in order, comprising:
a step (A) of applying a design layer coating material onto one face of a substrate film to form a design layer;
a step (B) of applying a clear layer coating material onto a surface of the design layer to form a clear layer;
a step (C) of thermally laminating a cover film to a surface of the clear layer; and
a step (D) of forming an adhesive layer on a face at an opposite side of the substrate film to the face where the design layer is formed.

This method enables production of a decorative laminate having excellent distinctness of design of a design layer and excellent surface smoothness of a clear layer after removal of a cover film.

In one embodiment of the method of producing a decorative laminate according to the present disclosure, a temperature of thermal lamination in the step (C) is 30° ° C. to 100° C.

In one embodiment of the method of producing a decorative laminate according to the present disclosure, the clear layer coating material contains an acrylic resin, and the acrylic resin has a glass-transition temperature (Tg) of 20° ° C. to 100° C.

In one embodiment of the method of producing a decorative laminate according to the present disclosure, the clear layer coating material has a viscosity of 300 mPa·s to 2,000 mPa·s at 25° C., and the design layer coating material has a viscosity of 300 mPa·s to 4,000 mPa·s at 25° C.

In one embodiment of the method of producing a decorative laminate according to the present disclosure, an absolute value of a difference between a solubility parameter (SP) value of a resin component of the clear layer coating material and a solubility parameter (SP) value of a resin component of the design layer coating material is 0.10 or more.

A vehicle according to the present disclosure comprises, at a vehicle surface, a laminate L resulting from removal of the cover film layer from any one of the decorative laminates set forth above, wherein the adhesive layer is adhered to the vehicle.

This results in the vehicle having excellent design properties.

Advantageous Effect

According to the present disclosure, it is possible to provide a decorative laminate having excellent distinctness of design of a design layer and excellent surface smoothness of a clear layer after removal of a cover film. Moreover, according to the present disclosure, it is possible to provide a method of producing this decorative laminate. Furthermore, according to the present disclosure, it is possible to provide a vehicle including a laminate having excellent design properties.

DETAILED DESCRIPTION

The following describes embodiments of the present disclosure. The following description is intended for illustrative purposes only, and is not intended to limit the scope of the present disclosure in any way.

Two or more of the embodiments can be freely combined.

Coating materials and coating material compositions referred to in the present disclosure can be used interchangeably.

Numerical ranges include the lower limit and the upper limit of that range, unless otherwise specified. For example, 20° C. to 100° C. indicates a range of not lower than 20° C. and not higher than 100° C.

The accompanying drawings are schematic diagrams that prioritize ease of understanding of the present disclosure, and thus elements in the drawings are not correctly to scale.

Reference signs referred to in the present disclosure such as first, second, (A), (B), (C), and (D) are merely reference signs for distinguishing between a given element and other elements and are not intended as a limitation on position or order.

The glass-transition temperature (Tg) of a resin component referred to in the present disclosure is measured by a method described in the EXAMPLES section.

The weight-average molecular weight Mw of a resin component referred to in the present disclosure is measured with an apparatus and conditions described in paragraph of JP2015-145103A.

Solubility parameter (SP) values referred to in the present disclosure are determined by a method described in K. W. Suh, D. H. Clarke, J. Polymer Sci., A-1, 5, 1671 (1967).

Short wave and long wave of a surface of a clear layer referred to in the present disclosure are measured by a method described in the EXAMPLES section.

Viscosities of a clear layer coating material and a design layer coating material referred to in the present disclosure are viscosities at 25° C., unless otherwise specified. The viscosities of a clear layer coating material and a design layer coating material are measured by a method described in the EXAMPLES section.

(Decorative Laminate)

A decorative laminate according to the present disclosure includes, adjacently to one another in order:
a cover film;
a clear layer;
a design layer;
a substrate film; and
an adhesive layer, wherein
the cover film is thermally laminated to the clear layer,
the design layer is a coating film of a design layer coating material, and
the clear layer is a coating film of a clear layer coating material.

Figure 1:
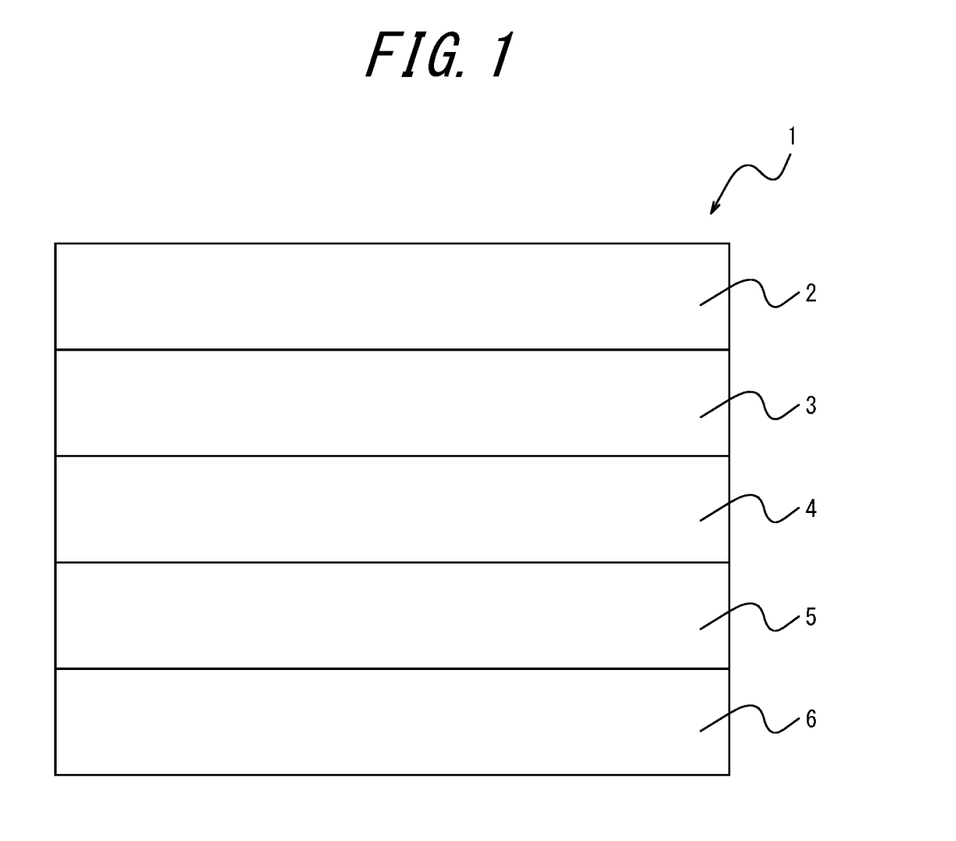
FIG. 1 is a schematic diagram illustrating one example of a layer configuration of a decorative laminate according to the present disclosure.

FIG. 1 is a schematic diagram illustrating one example of a layer configuration of the decorative laminate according to the present disclosure. A decorative laminate 1 in FIG. 1 includes a cover film 2, a clear layer 3, a design layer 4, a substrate film 5, and an adhesive layer 6 adjacently to one another in order.

Figure 2:
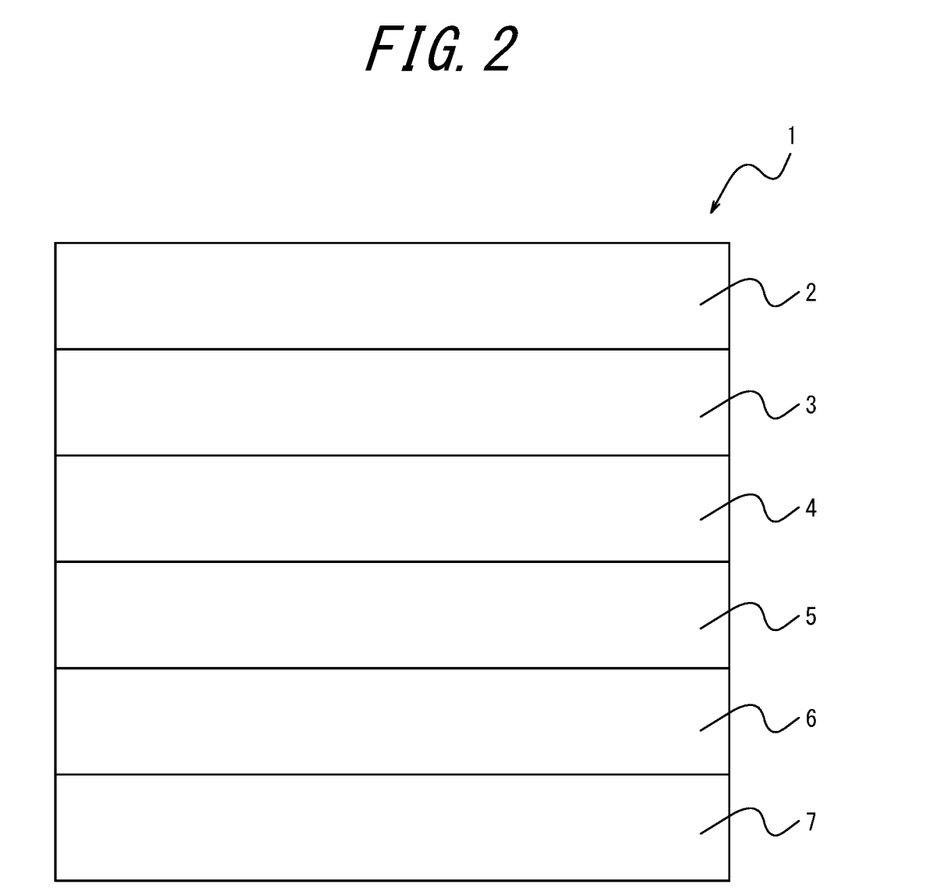
FIG. 2 is a schematic diagram illustrating another example of a layer configuration of a decorative laminate according to the present disclosure.

FIG. 2 is a schematic diagram illustrating another example of a layer configuration of the decorative laminate according to the present disclosure. A decorative laminate 1 in FIG. 2 includes a second cover film 7 at an outer side of the adhesive layer 6 of the decorative laminate 1 in FIG. 1.

The following describes the cover film, the clear layer, the design layer, the substrate film, and the adhesive layer, which are essential elements of the decorative laminate according to the present disclosure.

Cover Film

The cover film acts to protect the clear layer and the design layer of the decorative laminate until use. The cover film of the decorative laminate according to the present disclosure is thermally laminated to the subsequently described clear layer. As a result of the cover film being thermally laminated to the clear layer, heat of the thermal lamination causes deformation of a resin component of the clear layer and smoothing of a surface at the cover film-side of the clear layer such that this surface has good smoothness even after removal of the cover film.

Conventional cover films and protective films for decorative laminates that are publicly known can be used as the cover film.

The cover film may be a polyolefin film, a modified polyolefin film, a polyester film, a polystyrene-based resin film, a polyurethane film, a urethane nylon film, a polyamide film, a polyvinyl chloride film, a polyvinylidene chloride film, a polymethylpentene film, an acrylic film, or the like, for example.

The polyolefin film may be a polyethylene film, a polypropylene film, an unstretched (cast) polypropylene film (CPP film), or a biaxially stretched (oriented) polypropylene film (OPP film), for example.

The polyester film may be polyethylene terephthalate (PET), unstretched (cast) polyethylene terephthalate, biaxially stretched (oriented) polyethylene terephthalate, polycarbonate, polylactic acid, or the like, for example.

The polystyrene-based resin film may be a polystyrene film, an AS resin film, an ABS resin film, or the like, for example.

The thickness of the cover film should be adjusted as appropriate and may be 10 μm to 200 μm, and preferably 25 μm to 100 μm, for example.

The cover film may have a release agent applied at a surface thereof. For example, the cover film may have a release agent applied at either or both of a surface at a clear layer-side thereof and a surface at an opposite side thereof to the clear layer-side. The cover film may be a film that has undergone surface modification treatment such as corona treatment or low temperature plasma treatment. Moreover, the cover film may contain an additive such as an antistatic agent or a UV inhibitor.

A commercially available product may be used as the cover film. Examples of commercially available products for the cover film include Unipeel® (product name; Unipeel is a registered trademark in Japan, other countries, or both) produced by Unitika Ltd., Lumirror® S-10 (product name; Lumirror is a registered trademark in Japan, other countries, or both) produced by Toray Industries, Inc., PUREX A54 (product name) produced by Teijin Film Solutions, PET Separator TF-535 (product name) produced by Nippa Corporation, FILMBYNA® NT-2 (product name; FILMBYNA is a registered trademark in Japan, other countries, or both) produced by Fujimori Kogyo Co., Ltd., Cerapeel WZS (product name) produced by Toray Advanced Film Co., Ltd., SP4030 and SP4035 (product names) produced by Toyo Cloth Co., Ltd., RF1 CS006 (product name) produced by I'm Corporation, and PET238 (product name) produced by Nihon Matai Co., Ltd.

Clear Layer

The clear layer is a coating film of a clear layer coating material and acts to protect the design layer of the decorative laminate during use after the cover film has been removed. Conventional clear layers of automobile topcoat coating films and clear layers of decorative laminates that are publicly known can be used as the clear layer.

Conventional clear layer coating materials that are publicly known can be used as the clear layer coating material that forms the clear layer. The clear layer coating material may, for example, contain a resin component and a solvent.

The resin component of the clear layer coating material may be an acrylic resin, a polyester resin, an alkyd resin, a fluororesin, an epoxy resin, a polyurethane resin, a polyether resin, a polyolefin resin, or the like, for example. Moreover, a hydroxy group-containing acrylic resin (c-1), a non-aqueous dispersion acrylic resin (c-2), a diol resin (c-3), a polyisocyanate compound (c-4), or the like described in JP2020-100783A may, for example, be used as the resin component. Furthermore, a polyurethane acrylate (B1) described in JP2015-145103A, a urethane resin (D1) described in JP2017-007109A, or the like, for example, may be used as the resin component.

In one embodiment, the resin component of the clear layer coating material includes a thermosetting resin. In another embodiment, the resin component of the clear layer coating material includes a thermosetting resin and a photocurable resin. In yet another embodiment, the resin component of the clear layer coating material is only a thermosetting resin.

An acrylic resin is preferable as the resin component of the clear layer coating material. Moreover, it is preferable that a mixture of a resin component and an isocyanate compound is used in the clear layer coating material. In the case of such a mixture, tackiness is not displayed at around room temperature, but heating of the clear layer increases plasticity of the resin component, facilitates deformation of the resin component, and causes the display of tackiness to a certain degree.

The weight-average molecular weight of the acrylic resin of the clear layer coating material may be 1,000 to 200,000, and preferably 3,000 to 100,000, for example.

The glass-transition temperature (Tg) of the acrylic resin of the clear layer coating material may be 20° ° C. to 100° ° C., and preferably 30° C. to 80° ° C., for example. In one embodiment, Tg of the acrylic resin of the clear layer coating material is 20° C. or higher, 30° ° C. or higher, 40° C. or higher, 50° C. or higher, 60° C. or higher, or 70° C. or higher. In another embodiment, Tg of the acrylic resin of the clear layer coating material is 80° C. or lower, 70° ° C. or lower, 60° C. or lower, 50° C. or lower, 40° C. or lower, or 30° C. or lower.

The proportion constituted by the acrylic resin in the clear layer coating material may be 50 mass % or more, and preferably 60 mass % to 99 mass %, for example. In one embodiment, the proportion constituted by the acrylic resin in the clear layer coating material is 50 mass % or more, 60 mass % or more, 70 mass % or more, 80 mass % or more, or 90 mass % or more. In another embodiment, the proportion constituted by the acrylic resin in the clear layer coating material is 99 mass % or less, 90 mass % or less, 80 mass % or less, 70 mass % or less, or 65 mass % or less.

An SP value of the acrylic resin in the clear layer coating material may be 8.00 to 11.00, and preferably 9.00 to 10.50, for example. In one embodiment, the SP value of the acrylic resin in the clear layer coating material is 8.00 or more, 8.10 or more, 8.20 or more, 8.30 or more, 8.40 or more, 8.50 or more, 8.60 or more, 8.70 or more, 8.80 or more, 8.90 or more, 9.00 or more, 9.10 or more, 9.20 or more, 9.30 or more, 9.40 or more, 9.50 or more, 9.60 or more, 9.70 or more, 9.80 or more, 9.90 or more, 10.00 or more, 10.10 or more, 10.20 or more, 10.30 or more, 10.40 or more, 10.50 or more, 10.60 or more, 10.70 or of the acrylic resin in the clear layer coating material is 11.00 or less, 10.90 or less, 10.80 or less, 10.70 or less, 10.60 or less, 10.50 or less, 10.40 or less, 10.30 or less, 10.20 or less, 10.10 or less, 10.00 or less, 9.90 or less, 9.80 or less, 9.70 or less, 9.60 or less, 9.50 or less, 9.40 or less, 9.30 or less, 9.20 or less, 9.10 or less, 9.00 or less, 8.90 or less, 8.80 or less, 8.70 or less, 8.60 or less, 8.50 or less, 8.40 or less, 8.30 or less, 8.20 or less, or 8.10 or less. In a case in which a mixture of a plurality of acrylic resins is used, the SP value is an SP value determined by weighted averaging based on SP values of the individual acrylic resins and the mixing ratio thereof.

In one embodiment of the decorative laminate according to the present disclosure, the clear layer coating material contains an acrylic resin, and the acrylic resin has a glass-transition temperature (Tg) of 20° C. to 100° C.

Any compound that includes at least one isocyanate group can be used without any specific limitations as an isocyanate compound used in the clear layer coating material. For example, a publicly known isocyanate or isocyanate-based curing agent such as a monoisocyanate including one isocyanate group or a polyisocyanate including two or more isocyanate groups can be used.

The monoisocyanate may be methyl isocyanate, ethyl isocyanate, propyl isocyanate, butyl isocyanate, lauryl isocyanate, cyclohexyl isocyanate, phenyl isocyanate, tolylene isocyanate, or the like, for example.

The polyisocyanate may be an aromatic polyisocyanate such as tolylene diisocyanate, 4,4'-diphenylmethane diisocyanate, xylylene diisocyanate, or m-xylylene diisocyanate; an aliphatic isocyanate such as hexamethylene diisocyanate; an alicyclic isocyanate such as isophorone diisocyanate; a monomer or oligomer (biuret type, nurate type, adduct type, etc.) of any thereof; or the like, for example. Of these examples, it is preferable to use an HDI nurate type or allophanate type from a viewpoint of ensuring stretchability after curing.

Examples of commercially available products that may be used include R-271 (Nippon Paint Automotive Coatings Co., Ltd.), Crossnate UV (Dainichiseika Color and Chemicals Mfg. Co., Ltd.), D-178N (Mitsui Chemicals, Inc.), and Sumidur N-3400 (Sumitomo Bayer Urethane Co., Ltd.).

A blocked isocyanate compound in which an isocyanate group is blocked by a blocking agent can be used as the isocyanate compound. This can suppress reactivity of the isocyanate, provide better preservation stability, and facilitate handling in a reaction process.

Examples of blocking agents that may be used include monovalent alkyl alcohols and aromatic alcohols such as n-butanol, n-hexyl alcohol, 2-ethylhexanol, lauryl alcohol, phenol carbinol, and methyl phenyl carbinol; cellosolve such as ethylene glycol monohexyl ether or ethylene glycol mono(2-ethylhexyl) ether; polyether-type double hydroxy-terminated diols such as polyethylene glycol, polypropylene glycol, and polytetramethylene ether glycol phenol; diols such as ethylene glycol, propylene glycol, and 1,4-butanediol; polyester-type double hydroxy-terminated polyols obtained from dicarboxylic acids such as oxalic acid, succinic acid, adipic acid, suberic acid, and sebacic acid; phenols such as p-t-butylphenol and cresol; oximes such as dimethyl ketoxime, methyl ethyl ketoxime, methyl isobutyl ketoxime, methyl amyl ketoxime, and cyclohexanone oxime; and lactams, representative examples of which are ε-caprolactam and γ-butyrolactam.

Examples of commercially available products for blocked isocyanate compounds include DURANATE 17B-60PX and TPA-B80E (product names) produced by Asahi Kasei Corporation.

The resin component of the clear layer coating material may be one type of resin component used individually or two or more types of resin components used in combination.

The amount of the resin component of the clear layer coating material should be adjusted as appropriate and may be 10 mass % to 80 mass %, and preferably 20 mass % to 60 mass % relative to the total mass of the clear layer coating material inclusive of the solvent, etc., for example.

The solvent of the clear layer coating material may be water or an organic solvent, for example. The organic solvent may be an alcohol such as methanol, ethanol, 2-propanol, or 1-butanol; an ester such as ethyl acetate, butyl acetate, isobutyl acetate, ethyl propionate, ethylene glycol monomethyl ether acetate, propylene glycol monomethyl ether acetate, or propylene glycol monoethyl ether acetate; an ether such as diethyl ether, propylene glycol monomethyl ether, ethylene glycol monomethyl ether, ethylene glycol monoethyl ether, dioxane, or tetrahydrofuran (THF); a glycol such as ethylene glycol, diethylene glycol, propylene glycol, dipropylene glycol, 1,3-butylene glycol, pentamethylene glycol, or 1,3-octylene glycol; an amide such as formamide, N-methylformamide, dimethylformamide (DMF), dimethylacetamide, dimethyl sulfoxide (DMSO), or N-methylpyrrolidone (NMP); a ketone such as acetone, methyl ethyl ketone (MEK), methyl propyl ketone, methyl isobutyl ketone, acetylacetone, or cyclohexanone; an aliphatic hydrocarbon such as mineral spirit or kerosene; an aromatic hydrocarbon such as toluene, xylene, mesitylene, or dodecylbenzene; or a halogenated solvent such as chloroform or dichloromethylene. One solvent may be used individually, or two or more solvents may be used in combination.

The clear layer coating material may be an aqueous coating material or may be a solvent-based coating material. In the present disclosure, a coating material in which a dispersion medium of highest content in the coating material is water is referred to as an aqueous coating material, whereas a coating material in which a dispersion medium of highest content in the coating material is a solvent is referred to as a solvent-based coating material.

Conventional additives used in clear layer coating materials that are publicly known may be compounded in the clear layer coating material in addition to the resin component and the solvent. Examples of such additives include ultraviolet absorbers, light stabilizers, cross-linkers, curing agents, pigments, surface-modifying agents, defoamers, conductive fillers, hindered amine light stabilizers, antioxidants, and catalysts.

The viscosity of the clear layer coating material should be adjusted as appropriate and may be 100 mPa·s to 5,000 mPa·s, and preferably 300 mPa·s to 2,000 mPa·s, for example. In one embodiment, the viscosity of the clear layer coating material is 300 mPa·s or more, 400 mPa·s or more, 500 mPa·s or more, 1,000 mPa·s or more, or 1,500 mPa·s or more. In another embodiment, the viscosity of the clear layer coating material is 2,000 mPa·s or less, 1,500 mPa·s or less, 1,000 mPa·s or less, 500 mPa·s or less, or 400 mPa·s or less.

The thickness of the clear layer should be adjusted as appropriate and may be 10 μm to 60 μm, and preferably 20 μm to 50 μm, for example.

The surface at the cover film-side of the clear layer after the cover film has been removed has good surface smoothness as a result of thermal lamination as previously described. Surface smoothness improves and design properties of the decorative laminate are enhanced with decreasing height and period of irregularities at the coating film surface. In contrast, surface smoothness decreases and design properties of the decorative laminate deteriorate with increasing height and period of irregularities at the coating film surface.

Examples of indicators for the surface smoothness of a coating film include short wave (SW) and long wave (LW) determined using a Wavescan (product name) produced by BYK-Gardner. SW is an indicator that evaluates the degree of irregularities having fairly large height and period at a coating film surface. Such irregularities are also referred to as "orange peel". When a given coating film surface has an SW of 30.0 or less, this indicates that the surface thereof does not have an orange peel pattern and thus has good surface smoothness. Moreover, LW is an indicator that evaluates the degree of irregularities of larger height and period than orange peel at a coating film surface. Such irregularities are also referred to as a "rounds". When a given coating film surface has an LW of 20.0 or less, this indicates that the surface thereof does not have rounds and thus has good surface smoothness. For each of SW and LW, 1.0 is the maximum surface smoothness and indicates that a coating film surface is a mirror surface.

In one embodiment of the decorative laminate according to the present disclosure, short wave is 1.0 to 30.0 and long wave is 1.0 to 20.0 in a wave-scan of the surface of the clear layer in a state in which the cover film has been removed. In another embodiment, short wave is 1.0 to 10.0 and long wave is 1.0 to 8.0 in a wave-scan of the surface of the clear layer in a state in which the cover film has been removed.

Design Layer

The design layer is a coating film of a design layer coating material and is the main layer responsible for design properties of the decorative laminate. A conventional base layer of an automobile topcoat coating film or design layer or coloring layer of a decorative laminate that is publicly known can be used as the design layer.

A conventional design layer coating material or base coating film coating material that is publicly known can be used as the design layer coating material forming the design layer. The design layer coating material may, for example, contain a resin component, a pigment, and a solvent.

The resin component of the design layer coating material may be any of the resin components given as examples for the previously described clear layer coating material, for example.

In one embodiment, the resin component of the design layer coating material includes a thermosetting resin. In another embodiment, the resin component of the design layer coating material includes a thermosetting resin and a photocurable resin. In yet another embodiment, the resin component of the design layer coating material is only a thermosetting resin.

The resin component of the design layer coating material may be one type of resin component used individually or two or more types of resin components used in combination.

The resin component of the design layer coating material and the resin component of the clear layer coating material may be the same or may be different. From a viewpoint of inhibiting mixing of the design layer and the clear layer and increasing distinctness of design of the design layer as viewed by an observer, it is preferable that the resin component of the design layer coating material and the resin component of the clear layer coating material are different, and more preferable that the resin component of the design layer is a urethane resin.

In one embodiment of the decorative laminate according to the present disclosure, the design layer coating material preferably contains a urethane resin.

The urethane resin contained in the design layer coating material is preferably a urethane resin having an Mw of 10,000 to 200,000, and more preferably 30,000 to 150,000, but is not specifically limited thereto. Flexibility of the design layer increases when Mw is 10,000 or more, whereas producibility and coatability onto the substrate film of the design layer coating material increase when Mw is 200,000 or less.

Tg of the urethane resin is preferably −30° C. to 30° C. Coating film tackiness (blocking) after application and after drying increases when Tg of the urethane resin is −30° ° C. or higher, whereas coating film hardness decreases, formability increases, and low temperature physical properties as a product also increase when Tg is 30° C. or lower.

An SP value of the resin component contained in the design layer coating material may be 10.50 to 14.00, and preferably 11.00 to 12.50, for example. In one embodiment, the SP value of the resin component contained in the design layer coating material is 10.50 or more, 10.60 or more, 10.70 or more, 10.80 or more, 10.90 or more, 11.00 or more, 11.10 or more, 11.20 or more, 11.30 or more, 11.40 or more, 11.50 or more, 11.60 or more, 11.70 or more, 11.80 or more, 11.90 or more, 12.00 or more, 12.10 or more, 12.20 or more, 12.30 or more, 12.40 or more, 12.50 or more, 12.60 or more, 12.70 or more, 12.80 or more, 12.90 or more, 13.00 or more, 13.10 or more, 13.20 or more, 13.30 or more, 13.40 or more, 13.50 or more, 13.60 or more, 13.70 or more, 13.80 or more, or 13.90 or more. In another embodiment, the SP value of the resin component contained in the design layer coating material is 14.00 or less, 13.90 or less, 13.80 or less, 13.70 or less, 13.60 or less, 13.50 or less, 13.40 or less, 13.30 or less, 13.20 or less, 13.10 or less, 13.00 or less, 12.90 or less, 12.80 or less, 12.70 or less, 12.60 or less, 12.50 or less, 12.40 or less, 12.30 or less, 12.20 or less, 12.10 or less, 12.00 or less, 11.90 or less, 11.80 or less, 11.70 or less, 11.60 or less, 11.50 or less, 11.40 or less, 11.30 or less, 11.20 or less, 11.10 or less, 11.00 or less, 10.90 or less, 10.80 or less, 10.70 or less, or 10.60 or less. In a case in which a mixture of a plurality of resins is used, the SP value of the resin component is an SP value determined by weighted averaging based on SP values of the individual resins and the mixing ratio thereof.

In one embodiment of the decorative laminate according to the present disclosure, an absolute value of a difference between the solubility parameter (SP) value of the resin component of the clear layer coating material and the solubility parameter (SP) value of the resin component of the design layer coating material is 0.10 or more, and in another embodiment, this absolute value is 0.10 to 5.00. In yet another embodiment, the absolute value is 0.10 or more, 0.20 or more, 0.30 or more, 0.40 or more, 0.50 or more, 0.60 or more, 0.70 or more, 0.80 or more, 0.90 or more, 1.00 or more, 1.10 or more, 1.20 or more, 1.30 or more, 1.40 or more, 1.50 or more, 1.60 or more, 1.70 or more, 1.80 or more, 1.90 or more, 2.00 or more, 2.10 or more, 2.20 or more, 2.30 or more, 2.40 or more, 2.50 or more, 3.00 or more, 3.50 or more, 4.00 or more, or 4.50 or more. In yet another embodiment, the absolute value is 5.00 or less, 4.50 or less, 4.00 or less, 3.50 or less, 3.00 or less, 2.50 or less, 2.40 or less, 2.30 or less, 2.20 or less, 2.10 or less, 2.00 or less, 1.90 or less, 1.80 or less, 1.70 or less, 1.60 or less, 1.50 or less, 1.40 or less, 1.30 or less, 1.20 or less, 1.10 or less, 1.00 or less, 0.90 or less, 0.80 or less, 0.70 or less, 0.60 or less, 0.50 or less, 0.40 or less, 0.30 or less, or 0.20 or less. Note that the "resin component" of the clear layer coating material and the "resin component" of the design layer coating material refer to all resin compounded in these coating materials and are not inclusive of a curing agent. The resin component of each coating material may be a mixture of a plurality of resins. In a case in which each coating material contains a plurality of resins, the solubility parameter (SP) of the resin component of the coating material is an SP value determined through weighted averaging based on the SP values of the individual resins and the mixing ratio thereof.

The amount of the resin component of the design layer coating material should be adjusted as appropriate and may be 10 mass % to 60 mass %, and preferably 20 mass % to 50 mass % relative to the total mass of the design layer coating material inclusive of the solvent, for example.

Publicly known pigments can be used as the pigment of the design layer coating material without any specific limitations. The pigment may be an inorganic pigment, an organic pigment, or the like, for example. The pigment may be a metal such as aluminum, copper, zinc, iron, nickel, tin, or aluminum oxide; an alloy of any of these metals; a glitter pigment such as interference mica, white mica, graphite, glass flake, or alumina flake; or a scaly glitter pigment in which any of these metals, alloys, interference mica, white mica, graphite, glass flake, or alumina flake is coated with a metal oxide (for example, titanium oxide, titanium dioxide, or iron oxide) or a metal (for example, gold or silver). Other examples include an alumina flake pigment (a) described in JP2016-221473A; a scaly glitter pigment in which a metal substrate or glass flake substrate is coated with a metal oxide or metal; a scaly glitter pigment in which a coloring pigment is chemically adsorbed to the surface of a metal substrate or glass substrate; an aluminum pigment in which an aluminum oxide layer is formed at the surface of an aluminum substrate; an aluminum solid solution plate-shaped iron oxide pigment; a scaly glitter pigment in which the surface of interference mica, graphite, or silica flake is coated with titanium dioxide; and a plate-shaped iron oxide pigment.

The amount of the pigment of the design layer coating material should be adjusted as appropriate and may be 1 mass % to 70 mass %, and preferably 3 mass % to 60 mass % relative to the total mass of the design layer coating material inclusive of the solvent, for example.

The solvent of the design layer coating material may be any of the solvents given as examples for the previously described clear layer coating material, for example. One solvent may be used individually, or two or more solvents may be used in combination.

The design layer coating material may be an aqueous coating material or may be a solvent-based coating material.

Conventional additives used in design layer coating materials that are publicly known may be compounded in the design layer coating material in addition to the resin component and the solvent. Examples of such additives includes the additives given as examples for the previously described clear layer coating material.

The viscosity of the design layer coating material should be adjusted as appropriate and may be 100 mPa·s to 7,000 mPa·s, and preferably 300 mPa·s to 4,000 mPa·s, for example.

In one embodiment, the clear layer coating material has a viscosity of 300 mPa·s to 2,000 mPa·s, and the design layer coating material has a viscosity of 300 mPa·s to 4,000 mPa·s.

The thickness of the design layer should be adjusted as appropriate and may be 5 μm to 30 μm, and preferably 10 μm to 25 μm, for example.

The design layer may be composed of two or more design layers. For example, a first design layer and a second design layer that differ in terms of resin component, a material (pigment, etc.) in the coating material, thickness, etc. may be combined as the design layer. In the case of a plurality of design layers, the absolute value of a difference between the solubility parameter (SP) value of the resin component of the clear layer coating material and the solubility parameter (SP) value of a resin component of a design layer coating material used to form a design layer that is adjacent to the clear layer is preferably 0.10 or more.

Substrate Film

The substrate film is a member that acts as a substrate for the design layer and the clear layer, and also for the adhesive layer of the decorative laminate.

Conventional substrate films that are publicly known can be used as the substrate film without any specific limitations. For example, any of the films given as examples for the previously described cover film may be used as the substrate film. The substrate film is preferably a thermoplastic polyurethane resin film.

A commercially available product may be used as the substrate film. Examples of commercially available products for the substrate film include the films given as examples for the previously described cover film.

The thickness of the substrate film should be adjusted as appropriate and may be 25 μm to 300 μm, and preferably 50 μm to 200 μm, for example.

The substrate film may be a film that has undergone surface modification treatment such as corona treatment or low temperature plasma treatment. Moreover, the substrate film may contain an additive such as an antistatic agent or a UV inhibitor.

Adhesive Layer

The adhesive layer has a function of adhering the decorative laminate to an object that is to be decorated. Conventional adhesive layers, double-sided tape, and adhesives that are publicly known can be used as the adhesive layer without any specific limitations.

A polyester urethane resin, an acrylic resin, or the like, for example, may be used as an adhesive forming the adhesive layer.

From a viewpoint of the adhesive layer ensuring close adherence to an object and displaying peel strength such that peeling is possible as necessary, the adhesive layer preferably contains an acrylic resin and an isocyanate compound.

From a viewpoint of the adhesive layer ensuring close adherence to an object and displaying peeling strength such that peeling is possible as necessary, the peel strength of the adhesive layer with respect to an object is preferably 0.1 kgf/cm to 0.6 kgf/cm.

The thickness of the adhesive layer should be adjusted as appropriate and may be 5 μm to 50 μm, and preferably 10 μm to 30 μm, for example.

A commercially available product may be used as the adhesive layer. Examples of commercially available products for the adhesive layer include SK Dyne® (product name; SK Dyne is a registered trademark in Japan, other countries, or both) produced by Soken Chemical & Engineering Co., Ltd. and NS-S9T5 (product name) produced by Toyobo Co., Ltd.

Second Cover Film

The second cover film is a member that is optionally provided in the decorative laminate and has a function of protecting the adhesive layer and a function of facilitating handling during production, storage, and transport of the decorative laminate.

Conventional cover films that are publicly known can be used as the second cover film without any specific limitations. For example, any of the films given as examples for the previously described cover film (cover film adjacent to the clear layer; hereinafter, also referred to as a "first cover film") may be used as the cover film. The second cover film and the first cover film may be the same or may be different.

The dimensions and shape of the decorative laminate are not specifically limited, and desired dimensions and a desired shape can be adopted.

The application of the decorative laminate is not specifically limited, and the decorative laminate can be used for any article, structure, or the like. Examples of applications for the decorative laminate include the interior and exterior of bodies of vehicles such as automobiles and railroad vehicles, airframes of aircraft, and hulls and superstructures (outfitting) of watercraft; the interior, exterior, and roofing part of buildings; furniture and fittings; window glass of vehicles, aircraft, watercraft, buildings, etc.; cases, containers, resin plates, and films; housings and glass members of electrical goods such as displays, monitors, and refrigerators; coating films coated onto any thereof; inorganic building materials such as various types of cement, ceramic building materials, lightweight foamed concrete, mortar, slate, roofing, roof tiles, and ALC; wood; various types of glass; and metal substrates such as steel sheets, aluminum, and stainless steel.

In one embodiment, the application of the decorative laminate is one or more selected from the group consisting of a body of an automobile and a body of a railroad vehicle. In another embodiment, the application of the decorative laminate is a body of an automobile.

(Method of Producing Decorative Laminate)

A method of producing a decorative laminate according to the present disclosure is a method of producing a decorative laminate including a cover film, a clear layer, a design layer, a substrate film, and an adhesive layer adjacently to one another in order and includes:

a step (A) of applying a design layer coating material onto one face of a substrate film to form a design layer;

a step (B) of applying a clear layer coating material onto a surface of the design layer to form a clear layer;

a step (C) of thermally laminating a cover film to a surface of the clear layer; and a step (D) of forming an adhesive layer on a face at an opposite side of the substrate film to the face where the design layer is formed.

The following describes the steps (A) to (D) of the method of producing a decorative laminate according to the present disclosure.

Step (A)

In the step (A), a design layer coating material is applied onto one face of a substrate film to form a design layer.

The substrate film and the design layer coating material are as previously described for the decorative laminate.

From a viewpoint of inhibiting mixing of the design layer and the clear layer and increasing distinctness of design of the design layer as viewed by an observer, it is preferable that a resin component of the design layer coating material and a resin component of the clear layer coating material are different, and more preferable that the resin component of the design layer is a urethane resin.

In one embodiment, the design layer coating material contains a urethane resin.

An SP value of the resin component contained in the design layer coating material may be 10.50 to 14.00, and preferably 11.00 to 12.50, for example. In one embodiment, the SP value of the resin component contained in the design layer coating material is 10.50 or more, 10.60 or more, 10.70 or more, 10.80 or more, 10.90 or more, 11.00 or more, 11.10 or more, 11.20 or more, 11.30 or more, 11.40 or more, 11.50 or more, 11.60 or more, 11.70 or more, 11.80 or more, 11.90 or more, 12.00 or more, 12.10 or more, 12.20 or more, 12.30 or more, 12.40 or more, 12.50 or more, 12.60 or more, 12.70 or more, 12.80 or more, 12.90 or more, 13.00 or more, 13.10 or more, 13.20 or more, 13.30 or more, 13.40 or more, 13.50 or more, 13.60 or more, 13.70 or more, 13.80 or more, or 13.90 or more. In another embodiment, the SP value of the resin component contained in the design layer coating material is 14.00 or less, 13.90 or less, 13.80 or less, 13.70 or less, 13.60 or less, 13.50 or less, 13.40 or less, 13.30 or less, 13.20 or less, 13.10 or less, 13.00 or less, 12.90 or less, 12.80 or less, 12.70 or less, 12.60 or less, 12.50 or less, 12.40 or less, 12.30 or less, 12.20 or less, 12.10 or less, 12.00 or less, 11.90 or less, 11.80 or less, 11.70 or less, 11.60 or less, 11.50 or less, 11.40 or less, 11.30 or less, 11.20 or less, 11.10 or less, 11.00 or less, 10.90 or less, 10.80 or less, 10.70 or less, or 10.60 or less.

The viscosity of the design layer coating material should be adjusted as appropriate and may be 100 mPa·s to 7,000 mPa·s, and preferably 300 mPa·s to 4,000 mPa·s, for example.

Conventional application methods that are publicly known can be used as the application method of the design layer coating material without any specific limitations. The application method may be a method using spraying, an applicator, a die coater, a bar coater, a roll coater, a comma coater, a roller, a brush, a spatula, or the like, for example.

After application of the design layer coating material, drying under heating or at normal temperature may be performed as necessary. In a case in which heating is performed, the heating may be performed at a temperature of 60° C. to 130° C. for 1 minute to 20 minutes, for example.

The thickness (dry film thickness) of the design layer should be adjusted as appropriate and may be 5 μm to 30 μm, and preferably 10 μm to 25 μm, for example.

Step (B)

In the step (B), a clear layer coating material is applied onto a surface of the design layer to form a clear layer.

The clear layer coating material is as previously described for the decorative laminate.

An acrylic resin is preferable as the resin component of the clear layer coating material, and is preferably used as a mixture with an isocyanate compound.

The weight-average molecular weight of the acrylic resin of the clear layer coating material may be 1,000 to 200,000, and preferably 3,000 to 100,000, for example.

Tg of the acrylic resin of the clear layer coating material may be 20° C. to 100° C., and preferably 30° C. to 80° C., for example.

In one embodiment of the method of producing a decorative laminate according to the present disclosure, the clear layer coating material contains an acrylic resin, and the acrylic resin has a glass-transition temperature (Tg) of 20° ° C. to 100° C.

The proportion constituted by the acrylic resin in the clear layer coating material may be 50 mass % or more, and preferably 60 mass % to 99 mass %, for example.

An SP value of the acrylic resin in the clear layer coating material may be 8.00 to 11.00, and preferably 9.00 to 10.50, for example. In one embodiment, the SP value of the acrylic resin in the clear layer coating material is 8.00 or more, 8.10 or more, 8.20 or more, 8.30 or more, 8.40 or more, 8.50 or more, 8.60 or more, 8.70 or more, 8.80 or more, 8.90 or more, 9.00 or more, 9.10 or more, 9.20 or more, 9.30 or more, 9.40 or more, 9.50 or more, 9.60 or more, 9.70 or more, 9.80 or more, 9.90 or more, 10.00 or more, 10.10 or more, 10.20 or more, 10.30 or more, 10.40 or more, 10.50 or more, 10.60 or more, 10.70 or of the acrylic resin in the clear layer coating material is 11.00 or less, 10.90 or less, 10.80 or less, 10.70 or less, 10.60 or less, 10.50 or less, 10.40 or less, 10.30 or less, 10.20 or less, 10.10 or less, 10.00 or less, 9.90 or less, 9.80 or less, 9.70 or less, 9.60 or less, 9.50 or less, 9.40 or less, 9.30 or less, 9.20 or less, 9.10 or less, 9.00 or less, 8.90 or less, 8.80 or less, 8.70 or less, 8.60 or less, 8.50 or less, 8.40 or less, 8.30 or less, 8.20 or less, or 8.10 or less.

In one embodiment of the method of producing a decorative laminate according to the present disclosure, an absolute value of a difference between the solubility parameter (SP) value of the resin component of the clear layer coating material and the solubility parameter (SP) value of the resin component of the design layer coating material is 0.10 or more. In another embodiment, this absolute value is 0.10 to 5.00. In yet another embodiment, the absolute value is 0.10 or more, 0.20 or more, 0.30 or more, 0.40 or more, 0.50 or more, 0.60 or more, 0.70 or more, 0.80 or more, 0.90 or more, 1.00 or more, 1.10 or more, 1.20 or more, 1.30 or more, 1.40 or more, 1.50 or more, 1.60 or more, 1.70 or more, 1.80 or more, 1.90 or more, 2.00 or more, 2.10 or more, 2.20 or more, 2.30 or more, 2.40 or more, 2.50 or more, 3.00 or more, 3.50 or more, 4.00 or more, or 4.50 or more. In yet another embodiment, the absolute value is 5.00 or less, 4.50 or less, 4.00 or less, 3.50 or less, 3.00 or less, 2.50 or less, 2.40 or less, 2.30 or less, 2.20 or less, 2.10 or less, 2.00 or less, 1.90 or less, 1.80 or less, 1.70 or less, 1.60 or less, 1.50 or less, 1.40 or less, 1.30 or less, 1.20 or less, 1.10 or less, 1.00 or less, 0.90 or less, 0.80 or less, 0.70 or less, 0.60 or less, 0.50 or less, 0.40 or less, 0.30 or less, or 0.20 or less.

The isocyanate compound of the clear layer coating material may be any of the isocyanate compounds that were previously described for the clear layer coating material.

The resin component of the clear layer coating material may be one type of resin component used individually or two or more types of resin components used in combination.

The amount of the resin component of the clear layer coating material should be adjusted as appropriate and may be 10 mass % to 80 mass %, and preferably 20 mass % to 60 mass % relative to the total mass of the clear layer coating material inclusive of a solvent, for example.

The viscosity of the clear layer coating material should be adjusted as appropriate and may be 100 mPa·s to 5,000 mPa·s, and preferably 300 mPa·s to 2,000 mPa·s, for example.

In one embodiment of the method of producing a decorative laminate according to the present disclosure, the clear layer coating material has a viscosity of 300 mPa·s to 2,000 mPa·s at 25° C., and the design layer coating material has a viscosity of 300 mPa·s to 4,000 mPa·s at 25° C.

Conventional application methods that are publicly known can be used as the application method of the clear layer coating material without any specific limitations. The application method may, for example, be any of the application methods given as examples for the previously described step (A).

After application of the clear layer coating material, drying under heating or at normal temperature may be performed as necessary.

The step (A) and the step (B) may be performed concurrently. In other words, the design layer coating material may be applied to form an uncured design layer, the clear layer coating material may be applied onto the uncured design layer to form an uncured clear layer, and then the uncured design layer and the uncured clear layer may be cured together so as to concurrently form a design layer and a clear layer.

From a viewpoint of inhibiting mixing of the design layer and the clear layer and increasing distinctness of design of the design layer as viewed by an observer, performing the step (B) after the step (A) is preferable rather than performing the step (A) and the step (B) concurrently.

Moreover, the step (B) and the step (C) may be performed concurrently. In other words, the clear layer coating material may be applied to form an uncured clear layer, a cover film may be thermally laminated onto the uncured clear layer, and the uncured clear layer may be cured through this thermal lamination to form a clear layer.

After application of the clear layer coating material, drying under heating or at normal temperature may be performed as necessary. In a case in which heating is performed, the heating may be performed at a temperature of 60° ° C. to 130° ° C. for 1 minute to 20 minutes, for example.

The thickness (dry film thickness) of the clear layer should be adjusted as appropriate and may be 10 μm to 60 μm, and preferably 20 μm to 50 μm, for example.

Step (C)

In the step (C), a cover film is thermally laminated to a surface of the clear layer.

The cover film is as previously described for the decorative laminate.

The temperature of the thermal lamination should be adjusted as appropriate depending on the type and Tg of the resin component of the clear layer, for example. In a case in which an acrylic resin having a Tg of 20° C. to 100° C. is used as the resin component of the clear layer coating material, the temperature of the thermal lamination is preferably 30° ° C. to 100° C., and more preferably 30° ° C. to 80° C.

In one embodiment of the method of producing a decorative laminate according to the present disclosure, the temperature of the thermal lamination in the step (C) is 30° ° C. to 100° C.

The thermal lamination can be performed using a thermocompression film laminator (product name: MRK-650Y) produced by MCK Co., Ltd. or the like, for example.

Step (D)

In the step (D), an adhesive layer is formed on a face at an opposite side of the substrate film to the face where the design layer is formed.

The adhesive layer is as previously described for the decorative laminate.

An adhesive for forming an adhesive layer may be applied onto the face at the opposite side of the substrate film to the face where the design layer is formed so as to form the adhesive layer, or double-sided tape or the like may be affixed to the face at the opposite side of the substrate film to the face where the design layer is formed so as to form the adhesive layer.

The thickness of the adhesive layer should be adjusted as appropriate and may be 5 μm to 50 μm, and preferably 10 μm to 30 μm, for example.

The order of the step (D) may be after the step (A) or may be before the step (A).

Other Steps

The method of producing a decorative laminate may optionally include other steps in addition to the steps (A) to (D). Examples of such other steps include a step of affixing a second cover film to a face at an opposite side of the adhesive layer to the substrate film; a step of affixing a separate cover film to a face at an opposite side of the design layer to the substrate film after the step (A) and performing winding up; a step of unwinding before the step (B); a step of irradiating the clear layer with light such as ultraviolet light after the step (C) so as to further cure the clear layer; a curing step of winding up the laminate after the step (C) and storing the laminate at 30° ° C. to 50° C. for 3 days to 7 days such that curing of the clear layer and the design layer progresses; a step of unwinding before the step (D); a step of winding up an elongated decorative laminate to obtain a roll-shaped decorative laminate; a curing step of storing the elongated decorative laminate at 30° ° C. to 50° C. for 3 days to 7 days such that curing of the clear layer, the design layer, and the adhesive layer progresses; and a step of cutting the elongated decorative laminate to obtain single-sheet decorative laminates.

(Vehicle)

A vehicle according to the present disclosure includes, at a vehicle surface, a laminate L resulting from removal of the cover film layer from any one of the decorative laminates set forth above, wherein the adhesive layer is adhered to the vehicle.

Figure 3:
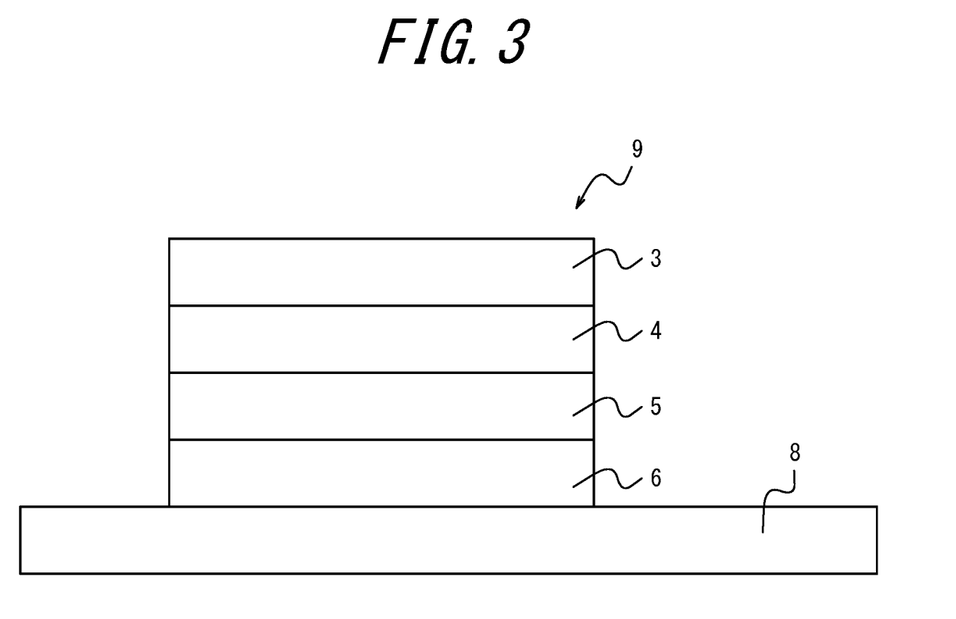
FIG. 3 is a schematic cross-sectional diagram illustrating one example of a vehicle according to the present disclosure that includes a laminate L at a vehicle surface.

FIG. 3 is a schematic cross-sectional diagram illustrating one example of the vehicle having the laminate L at a vehicle surface. A side of the laminate L 9 corresponding to the adhesive layer 6 is adhered to a vehicle surface 8. In other words, the laminate L 9 is disposed on the vehicle surface 8 with the clear layer 3 of the laminate L 9 positioned at a side corresponding to an observer.

The laminate L is formed by removing the cover film from the previously described decorative laminate. In a case in which the decorative laminate has the configuration illustrated in FIG. 1, the cover film may be removed after the decorative laminate has been adhered to the vehicle surface or may be removed before the decorative laminate is adhered to the vehicle surface. In a case in which the decorative laminate has the configuration illustrated in FIG. 2, the first cover film may be removed after the decorative laminate from which the second cover film has been removed has been adhered to the vehicle surface, or a laminate L resulting from removal of the first cover film and the second cover film from the decorative laminate may be adhered to the vehicle surface.

The surface of the clear layer of the laminate L (surface that was in contact with the cover film) has good smoothness even after removal of the cover film as a result of the cover film being thermally laminated to the clear layer in the decorative laminate as previously described.

In one embodiment, short wave is 1.0 to 30.0 and long wave is 1.0 to 20.0 in a wave-scan of the surface of the clear layer of the laminate L (surface that was in contact with the cover film).

The vehicle surface having the laminate L may be a surface at an outer panel-side of the vehicle, a surface at an interior-side of the vehicle, or a combination thereof. The vehicle surface may be a surface of a metal product such as a steel sheet, a surface of a plastic product, or a combination thereof. The surface of the metal product may be surface that has been processed or a surface that has been coated.

EXAMPLES

The following provides a more detailed description of the present disclosure through examples. However, these examples are for illustrative purposes and are not intended to limit the scope of the present disclosure in any way.

Details of cover films used in the examples are as follows.
Cover film 1: Cerapeel 38WZ(S) (product name) produced by Toray Industries, Inc.; PET film; thickness 38 μm
Cover film 2: EMBLET PHH25 (product name) produced by Unitika Ltd.; polyester film; thickness 25 μm
Cover film 3: NT200A (product name) produced by Nakamoto Packs Co., Ltd.; PET film; thickness 100 μm
Cover film 4: Novaclear SG007 (product name) produced by Mitsubishi Chemical Corporation; PET film; thickness 220 μm
Cover film 5: ALPHAN PY-001 (product name) produced by Oji F-Tex Co., Ltd.; PP film; thickness 50 μm
Cover film 6: Lumirror S-10 (product name) produced by Toray Industries, Inc.; PET film; thickness 25 μm Details of components of clear layer coating materials used in the examples are as follows.
Acrylic resin 1: LR2731 (product name) produced by Mitsubishi Rayon Co., Ltd.; Tg 20° C.; SP value 10.5; Mw 5,500; solid content 70%
Acrylic resin 2: BAR-010 (product name) produced by Hitachi Chemical Co., Ltd.; Tg 60° C.; SP value 9.69; Mw 14,000; solid content 50%
Acrylic resin 3: A205 (product name) produced by Mitsubishi Rayon Co., Ltd.; Tg 40° C.; SP value 10.35; Mw 8,000; solid content 60%
Curing agent: H2550 (product name) produced by Nippon Paint Automotive Coatings Co., Ltd.; isocyanate compound Details of components of design layer coating materials used in the examples are as follows.
Acrylic resin 4: ACS2050-55 (product name) produced by Toray Industries, Inc.; Tg 50° C.; SP value 10.1; Mw 16,000; solid content 55%
Acrylic resin 5: A200 (product name) produced by Toray Industries, Inc.; Tg –14° C.; SP value 10.6; Mw 49,000; solid content 60%
Urethane resin 1: TAKELAC TE5430 (product name) produced by Mitsui Chemicals, Inc.; SP value 10.958
Urethane resin 2: Msk12M19N32 (product name) produced by Dainichiseika Color and Chemicals Mfg. Co., Ltd.; SP value 11 to 14
Curing agent: TAKENATE D-178NL (product name) produced by Mitsui Chemicals, Inc.; polyisocyanate
Pigment: ALPASTE 93-0467 (product name) produced by Toyo Aluminum K.K.

Details of a substrate film used in the examples are as follows.
Substrate film: ESMER PX98 (product name) produced by Nihon Matai Co., Ltd.; thermoplastic polyurethane resin film; thickness 150 μm; length 500 m Details of components of an adhesive layer composition used in the examples are as follows.
Acrylic resin: SK Dyne 1811L (product name) produced by Soken Chemical & Engineering Co., Ltd.; Tg –7° C.; SP value 10.5; Mw 5,500; solid content 70%
Isocyanate compound: TD-75 (product name) produced by Soken Chemical & Engineering Co., Ltd.

Details of other materials and instruments used in the examples are as follows.
Clear layer coating material: Two-component curing-type clear coating material produced by Nippon Paint Automotive Coatings Co., Ltd.; R2550 (product name)
Design layer coating material: Two-component curing-type base coating material produced by Nippon Paint Automotive Coatings Co., Ltd.; R333 (product name)
Primer coating material: One-component primer produced by Nippon Paint Automotive Coatings Co., Ltd.
Dull steel sheet: Zinc phosphate-treated dull steel sheet (length 300 mm, width 100 mm, thickness 0.8 mm)
Differential scanning calorimeter: SSC5200 (product name) produced by Seiko Instruments Inc.
Wave-scan: Wavescan (product name) produced by BYK-Gardner Tg of a resin component was taken to be a value determined by evaporating solvent from the resin component under reduced pressure, performing the subsequently described first to third steps using the differential scanning calorimeter, and then obtaining a value from a chart for during heating in the third step.
First step: Heating from 20° C. to 150° C. (heating rate 10° C./min)
Second step: Cooling from 150° C. to –50° C. (cooling rate 10° C./min)
Third step: Heating from –50° C. to 150° C. (heating rate 10° C./min)

The viscosities of a clear layer coating material and a design layer coating material were measured under conditions of 25° C. using a B-type viscometer.

SP values of an acrylic resin of a clear layer coating material and a urethane resin of a design layer coating material were measured by the previously described method.

(Production of Clear Layer Coating Materials)

Clear layer coating materials 1 to 5 were produced by mixing an acrylic resin and a curing agent in formulations (parts by mass) indicated in Table 1 and then performing dilution and viscosity adjustment with methyl ethyl ketone as necessary.

(Production of Design Layer Coating Materials)

Design layer coating materials 1 to 5 were produced by mixing a urethane resin, an acrylic resin, a curing agent, and a pigment in formulations (parts by mass) indicated in Table 2 and then performing dilution and viscosity adjustment with methyl ethyl ketone as necessary.

(Production of Adhesive Layer Composition)

An adhesive layer composition was produced by mixing 100 parts by mass of SK Dyne 1811L and 0.2 parts by mass of TD-75.

Example 1

The design layer coating material 1 was applied onto one face of the substrate film by a comma direct coater such as to have a dry film thickness of 20 μm to 25 μm, and then an uncured design layer thereof was heated at a temperature of 90° C. for 5 minutes to form a design layer. Next, the clear layer coating material 1 was applied onto a surface of the design layer by a comma direct coater such as to have a dry film thickness of 30 μm to 35 μm and was cured through 5 minutes of heating at a temperature of 90° C. to form a clear layer. Next, the cover film 1 was thermally laminated to a surface of the cured clear layer at a temperature of 30° C. so as to thermally laminate the cover film to the clear layer. Next, the adhesive layer composition was applied onto a face at an opposite side of the substrate film to the face where the design layer was formed so as to form an adhesive layer having a film thickness of 30 μm and obtain an elongated decorative laminate including an adhesive layer, a substrate film, a design layer, a clear layer, and a cover film adjacently to one another in order.

Examples 2 to 6

Various steps were performed and an elongated decorative laminate was obtained in the same way as in Example 1 with the exception that the cover film was changed as indicated in Table 3.

Comparative Example 1

Various steps were performed and an elongated decorative laminate was obtained in the same way as in Example 1 with the exception that a cover film was not used and thermal lamination was not performed as indicated in Table 3.

Examples 7 to 16

Various steps were performed and an elongated decorative laminate was obtained in the same way as in Example 1 with the exception that the clear layer coating material, the design layer coating material, or the thermal lamination temperature was changed as indicated in Table 4.

A decorative laminate of 15 cm in length and 7 cm in width was cut out from the elongated decorative laminate of each example or comparative example, and the adhesive layer was adhered to a dull steel sheet envisaging a body of an automobile. Next, the cover film was removed so as to expose the clear layer and provide, at the surface of the dull steel sheet, a laminate L including an adhesive layer, a substrate film, a design layer, and a clear layer adjacently to one another in order from a side corresponding to the surface of the dull steel sheet.

Evaluation of Design Properties

The distinctness of design of the design layer and the surface smoothness of the clear layer in the obtained laminate L were evaluated as follows.

Distinctness of Design of Design Layer

The laminate L was visually observed and was evaluated by the following standard. "Good" or "Acceptable" was considered to pass evaluation.

Good: No fine irregularities and fluorescent lamp clearly visible

Acceptable: Almost no fine irregularities and fluorescent lamp fairly clearly visible Unacceptable: Fine irregularities clearly visible and fluorescent lamp blurred Surface Smoothness of Clear Layer SW and LW of the clear layer of the laminate L were measured by a wave-scan.

SW pass: SW value within range of 1.0 to 30.0

SW fail: SW value larger than 30.0

LW pass: LW value within range of 1.0 to 20.0

LW fail: LW value larger than 20.0

TABLE 1

| | | Clear layer coating material number | | | | |
|---|---|---|---|---|---|---|
| | | 1 | 2 | 3 | 4 | 5 |
| Composition (parts by mass) | Acrylic resin 1 (Tg 20° C.) | 51 | — | — | 51 | 51 |
| | Acrylic resin 2 (Tg 60° C.) | — | 51 | — | — | — |
| | Acrylic resin 3 (Tg 40° C.) | — | — | 51 | — | — |
| | Curing agent | 30 | 30 | 30 | 30 | 30 |
| | Viscosity (mPa · s) | 400 | 400 | 400 | 300 | 2000 |
| SP value of resin component of clear layer coating material | | 10.50 | 9.69 | 10.35 | 10.50 | 10.50 |

TABLE 2

| | | Design layer coating material number | | | | | SP value of resin |
|---|---|---|---|---|---|---|---|
| | | 1 | 2 | 3 | 4 | 5 | |
| Composition (parts by mass) | Urethane resin 1 | 25 | 25 | 25 | 0 | 0 | 10.958 |
| | Urethane resin 2 | 45 | 45 | 45 | 0 | 0 | 11 to 14 |
| | Acrylic resin 4 | 30 | 30 | 30 | 100 | 0 | 10.1 |

TABLE 2-continued

|  | Design layer coating material number | | | | | SP value of resin |
|---|---|---|---|---|---|---|
|  | 1 | 2 | 3 | 4 | 5 | |
| Acrylic resin 5 | 0 | 0 | 0 | 0 | 100 | 10.6 |
| Curing agent | 2 | 2 | 2 | 2 | 2 | — |
| Pigment | 15 | 15 | 15 | 15 | 15 | — |
| Viscosity (mPa · s) | 500 | 300 | 4000 | 500 | 500 | — |
| SP value of resin component of design layer coating material | 10.72 to 12.07 | 10.72 to 12.07 | 10.72 to 12.07 | 10.1 | 10.6 | — |

TABLE 3

| | | Example 1 | Example 2 | Example 3 | Example 4 | Example 5 | Example 6 | Comparative Example 1 |
|---|---|---|---|---|---|---|---|---|
| Cover film | Number | 1 | 2 | 3 | 4 | 5 | 6 | None |
| | Thickness (μm) | 38 | 25 | 100 | 220 | 50 | 25 | None |
| Clear layer | Coating material number | 1 | 1 | 1 | 1 | 1 | 1 | 1 |
| Design layer | Coating material number | 1 | 1 | 1 | 1 | 1 | 1 | 1 |
| | Absolute value of difference between SP values | 0.22 to 1.57 | 0.22 to 1.57 | 0.22 to 1.57 | 0.22 to 1.57 | 0.22 to 1.57 | 0.22 to 1.57 | 0.22 to 1.57 |
| | Thermal lamination temperature (° C.) | 30 | 30 | 30 | 30 | 30 | 30 | — |
| | Peeling of cover film | Good | Good | Good | Good | Good | Good | — |
| Evaluation | Distinctness | Good | Good | Good | Good | Good | Good | Good |
| | Surface smoothness SW | 2.0 | 1.8 | 2.5 | 2.0 | 3.0 | 3.0 | Not measurable |
| | Surface smoothness LW | 2.0 | 2.0 | 3.0 | 3.0 | 3.0 | 4.0 | Not measurable |

TABLE 4

| | | Example 7 | Example 8 | Example 9 | Example 10 | Example 11 | Example 12 |
|---|---|---|---|---|---|---|---|
| Cover film | Number | 1 | 1 | 1 | 1 | 1 | 1 |
| | Thickness (μm) | 38 | 38 | 38 | 38 | 38 | 38 |
| Clear layer | Coating material number | 1 | 1 | 2 | 3 | 4 | 5 |
| Design layer | Coating material number | 1 | 1 | 1 | 1 | 1 | 1 |
| | Absolute value of difference between SP values | 0.22 to 1.57 | 0.22 to 1.58 | 1.03 to 2.38 | 0.37 to 1.72 | 0.22 to 1.57 | 0.22 to 1.57 |
| | Thermal lamination temperature (° C.) | 60 | 80 | 70 | 50 | 30 | 30 |
| | Peeling of cover film | Good | Good | Good | Good | Good | Good |
| Evaluation | Distinctness | Good | Good | Good | Good | Good | Acceptable |
| | Surface smoothness SW | 2.0 | 2.0 | 3.0 | 2.0 | 2.5 | 3.0 |
| | Surface smoothness LW | 3.0 | 3.0 | 3.0 | 3.0 | 3.0 | 4.0 |

| | | Example 13 | Example 14 | Example 15 | Example 16 |
|---|---|---|---|---|---|
| Cover film | Number | 1 | 1 | 1 | 1 |
| | Thickness (μm) | 38 | 38 | 38 | 38 |
| Clear layer | Coating material number | 1 | 1 | 1 | 1 |
| Design layer | Coating material number | 2 | 3 | 4 | 5 |
| | Absolute value of difference between SP values | 0.22 to 1.57 | 0.22 to 1.57 | 0.4 | 0.1 |
| | Thermal lamination temperature (° C.) | 30 | 30 | 30 | 30 |
| | Peeling of cover film | Good | Good | Good | Good |
| Evaluation | Distinctness | Good | Good | Good | Acceptable |
| | Surface smoothness SW | 2.0 | 2.0 | 3.0 | 3.0 |
| | Surface smoothness LW | 3.0 | 3.0 | 4.0 | 4.0 |

As shown in Tables 3 and 4, decorative laminates having excellent surface smoothness of a clear layer and excellent distinctness of design of a design layer were obtained in the examples.

INDUSTRIAL APPLICABILITY

According to the present disclosure, it is possible to provide a decorative laminate having excellent distinctness of design of a design layer and excellent surface smoothness of a clear layer after removal of a cover film. Moreover, according to the present disclosure, it is possible to provide a method of producing a laminate of this decorative laminate. Furthermore, according to the present disclosure, it is possible to provide a vehicle including a laminate having excellent design properties.

REFERENCE SIGNS LIST

1: Decorative laminate
2: Cover film
3: Clear layer
4: Design layer
5: Substrate film
6: Adhesive layer
7: Second cover film
8: Vehicle surface
9: Laminate L

The invention claimed is:

1. A decorative laminate comprising, adjacently to one another in order:
   a cover film;
   a clear layer;
   a design layer;
   a substrate film; and
   an adhesive layer, wherein
   the cover film and the clear layer are in direct contact with each other,
   the clear layer and the design layer are in direct contact with each other,
   the design layer and the substrate film are in direct contact with each other,
   the substrate film and the adhesive layer are in direct contact with each other,
   the cover film is thermally laminated to the clear layer,
   the substrate film is selected from the group consisting of a thermoplastic polyurethane resin film, a polyolefin film, a modified polyolefin film, a polyester film, a polystyrene-based resin film, a urethane nylon film, a polyamide film, a polyvinyl chloride film, a polyvinylidene chloride film, a polymethylpentene film, and an acrylic film,
   the design layer is a coating film of a design layer coating material, and
   the clear layer is a coating film of a clear layer coating material.

2. The decorative laminate according to claim 1, wherein the clear layer coating material contains an acrylic resin, and the acrylic resin has a glass-transition temperature (Tg) of 20° C. to 100° C.

3. The decorative laminate according to claim 1, wherein an absolute value of a difference between a solubility parameter (SP) value of a resin component of the clear layer coating material and a solubility parameter (SP) value of a resin component of the design layer coating material is 0.10 or more.

4. The decorative laminate according to claim 1, wherein short wave is 1.0 to 30.0 and long wave is 1.0 to 20.0 in a wave-scan of a surface of the clear layer in a state in which the cover film has been removed.

5. A method of producing a decorative laminate that includes a cover film, a clear layer, a design layer, a substrate film, and an adhesive layer adjacently to one another in order, the method comprising:
   a step (A) of applying a design layer coating material onto one face of a substrate film to form a design layer;
   a step (B) of applying a clear layer coating material onto a surface of the design layer to form a clear layer;
   a step (C) of thermally laminating a cover film to a surface of the clear layer; and
   a step (D) of forming an adhesive layer on a face at an opposite side of the substrate film to the face where the design layer is formed.

6. The method of producing a decorative laminate according to claim 5, wherein a temperature of thermal lamination in the step (C) is 30° C. to 100° C.

7. The method of producing a decorative laminate according to claim 5, wherein the clear layer coating material contains an acrylic resin, and the acrylic resin has a glass-transition temperature (Tg) of 20° C. to 100° C.

8. The method of producing a decorative laminate according to claim 5, wherein
   the clear layer coating material has a viscosity of 300 mPa·s to 2,000 mPa·s at 25° C., and
   the design layer coating material has a viscosity of 300 mPa·s to 4,000 mPa·s at 25° C.

9. The method of producing a decorative laminate according to claim 5, wherein an absolute value of a difference between a solubility parameter (SP) value of a resin component of the clear layer coating material and a solubility parameter (SP) value of a resin component of the design layer coating material is 0.10 or more.

10. A vehicle comprising, at a vehicle surface, a laminate L resulting from removal of the cover film from the decorative laminate according to claim 1, wherein the adhesive layer is adhered to the vehicle.

11. The decorative laminate according to claim 1, wherein the substrate film is a thermoplastic polyurethane resin film.

* * * * *